United States Patent [19]
Varner et al.

[11] Patent Number: 5,512,087
[45] Date of Patent: Apr. 30, 1996

[54] PETROLEUM VAPOR CONTROL APPARATUS

[75] Inventors: Richard Varner, Corona del Mar; Joseph M. Irwin, Lakewood, both of Calif.

[73] Assignee: Newport Petroleum, Seal Beach, Calif.

[21] Appl. No.: 296,846

[22] Filed: Aug. 26, 1994

Related U.S. Application Data

[63] Continuation-in-part of Ser. No. 278,996, Jul. 22, 1994, which is a continuation of Ser. No. 881,621, May 12, 1992, abandoned.

[51] Int. Cl.⁶ ..................................................... B01D 53/04
[52] U.S. Cl. ................... 96/133; 96/113; 96/130; 55/274; 55/356
[58] Field of Search .................. 96/113, 121, 126–128, 96/130–133; 55/274, 356, 422

[56] References Cited

U.S. PATENT DOCUMENTS

| | | | |
|---|---|---|---|
| 2,625,237 | 1/1953 | Gribler et al. | 96/126 |
| 2,965,196 | 12/1960 | Rich, Jr. | 96/130 X |
| 3,069,830 | 12/1962 | Skarstrom et al. | 96/126 X |
| 3,164,452 | 1/1965 | Westeren et al. | 96/126 X |
| 3,242,650 | 3/1966 | Crawford | 96/113 |
| 3,311,454 | 3/1967 | Kemeny et al. | 96/113 X |
| 3,776,283 | 12/1973 | Kramer et al. | 96/113 X |
| 3,867,111 | 2/1975 | Knowles | 96/113 X |
| 3,918,932 | 11/1975 | Lee et al. | 96/133 X |
| 3,942,960 | 3/1976 | Girard | 96/130 X |
| 3,996,975 | 12/1976 | Hansel | 96/113 X |
| 4,058,147 | 11/1977 | Stary et al. | 96/130 X |
| 4,392,870 | 7/1983 | Chieffo et al. | 96/130 X |
| 4,496,376 | 1/1985 | Hradek | 96/126 X |
| 4,502,873 | 3/1985 | Mottram et al. | 96/130 X |
| 4,509,272 | 4/1985 | Gräff | 96/127 X |
| 4,963,168 | 10/1990 | Spencer | 96/130 X |
| 4,995,890 | 2/1991 | Croudace | 96/127 X |
| 5,112,367 | 5/1992 | Hill | 96/130 X |

FOREIGN PATENT DOCUMENTS

| | | | |
|---|---|---|---|
| 63-319019 | 12/1988 | Japan | 96/128 |
| 1-245827 | 10/1989 | Japan | 96/133 |
| 0425621 | 3/1935 | United Kingdom | 96/126 |

Primary Examiner—Robert Spitzer

[57] ABSTRACT

An improved petroleum vapor control apparatus for scrubbing petroleum vapors at high flow rates without generating dangerous levels of backpressure. The apparatus comprises a substantially air-tight housing into which petroleum vapors are ducted. The vapors are passed through an activated carbon adsorber bed having a large-diameter outlet, after which the scrubbed vapors pass into a zone of controlled pressure. The scrubbed vapors are then vented to the atmosphere. The housing is preferably able to withstand marine conditions, so that the apparatus can be used on marine barges which carry petroleum products.

21 Claims, 8 Drawing Sheets

PETROLEUM VAPOR CONTROL APPARATUS

The present application is a continuation-in-part of Ser. No. 08/278,996 filed on Jul. 22, 1994, which is a continuation of Ser. No. 07/881,621, filed on May 12, 1992, now abandoned. The contents of the foregoing applications which are not otherwise contained in the present application are hereby incorporated by reference.

FIELD OF THE INVENTION

The present invention relates to an improved petroleum vapor control apparatus for scrubbing petroleum vapors at high flow rates without generating dangerous levels of backpressure. The apparatus of the invention is also well suited to withstand the environmentally demanding conditions of a marine environment. This invention can, in particular, be used on marine barges which carry petroleum products.

BACKGROUND OF THE INVENTION

In recent years, the public has become increasingly aware of the environmental problems associated with the unregulated use of petroleum products. This has prompted the government to regulate not only the burning of petroleum fuels, but also the processing and the transfer of raw petroleum products. In particular, the government has focused on controlling the emission of hydrocarbon vapors and other pollutants which are released when volatile petroleum products come into contact with the atmosphere.

Although the regulation of petroleum vapor emissions was limited at first to stationary sources, such as refineries and tank farms, the scope of government regulations has gradually expanded to include mobile sources such as cars, ships, airplanes and trucks. In general, stationary sources of vapor emissions have been required to provide means for processing hydrocarbon emissions, while mobile carriers of volatile petroleum products have been required only to collect and to present petroleum vapors for further processing. For example, gas stations in California are required to provide special hoses which gather the vapors otherwise vented to the atmosphere during the fueling of an automobile. The mobile source of hydrocarbon vapor emissions, in this case the automobile, is required only to present petroleum vapors for further handling by the gas station.

Several jurisdictions have also adopted pollution control laws which place limits on petroleum vapor emissions during the loading of marine cargo vessels with volatile petroleum products. Like the California laws governing gas stations, these laws generally require that stationary, shore-based facilities process the petroleum vapors. Ships carrying petroleum products must therefore possess a means for presenting such vapors to a shore-side facility unless they have some other means of controlling petroleum vapor emissions.

In addition, some shore-side vapor processing facilities require that vapors be inerted, or made non-explosive, before being presented to the facility. Vapors are normally inerted by channeling inert gases, such as $CO_2$, into the compartments containing petroleum products. Ships presenting vapors to such facilities must therefore also be outfitted with inerting systems.

Although the component of petroleum vapor emissions most often targeted for regulation is hydrocarbon vapor, pollutants besides hydrocarbons are also released by volatile petroleum products. Some grades of raw petroleum, for example, contain hydrogen sulfide and other hydrogen-containing organic compounds. When released into the air, these compounds produce an unpleasant odor, which has led to the regulation of the release of such compounds in residential areas.

The current practice of ships calling on ports with pollution control requirements is to install piping on such ships which connects the venting systems of the storage compartments of such vessels to a common collection manifold, known as a header pipe. The vapors can then be ducted from this manifold to a shore-side facility for processing. However, if the ship does not already have an inerting system and the shore-side facility requires that inerted vapors be presented for processing, an inerting system must also be installed. The most common type of inerting system involves ducting the exhaust from a ship's engines to petroleum storage compartments. Barges, however, cannot be outfitted with conventional inerting systems because they do not possess the capability of generating large volumes of inert gas.

Since many jurisdictions, especially jurisdictions outside the U.S., do not yet have air pollution control requirements, many marine vessels are not equipped to control hydrocarbon vapor emissions. There is therefore a great need for a portable, cost-effective means of controlling petroleum vapor emissions which may be transported to a ship in need of petroleum vapor control.

SUMMARY OF THE INVENTION

The present invention comprises an improved petroleum vapor control apparatus which reduces the backpressure generated during the scrubbing of petroleum vapors. This apparatus comprises a substantially air-tight housing for containing conduits and at least one adsorber bed located on the floor of the housing. A conduit passes through an opening in the housing and conducts petroleum vapors into the housing. This conduit is connected inside the housing to the inlet end of an adsorber bed. The adsorber bed comprises an adsorbent material, which is preferably activated carbon and more preferably is activated carbon impregnated with a caustic solution. The adsorber bed further comprises an outlet, which preferably has a diameter which allows gas to be passed through the adsorber without producing backpressure greater than about 2 psi at petroleum vapor flow rates of about 45,000 cubic feet or more per hour. The outlet is preferably greater than about 8 inches in diameter, and more preferably about 10 inches in diameter.

The housing of the apparatus of the invention preferably provides a zone of controlled pressure outside of the adsorber bed. This controlled pressure assures that the petroleum vapors contact the adsorbent material for a sufficient length of time to effect the scrubbing of the vapors. Pressures in the range of about 0.5 psi to about 1.5 psi, and more preferably of about 1.25 psi, should be maintained in the housing. Such pressures are maintained by a valve in the housing. This valve can serve as the outlet vent of the housing, or the housing can have a separate vent for venting scrubbed gases to the atmosphere. Preferably, the valve is located on the outside of the housing. The valve can, in one embodiment, comprise an opening in the housing approximately 6 inches in diameter. The valve should be capable of maintaining a controlled pressure in the housing during petroleum vapor flow rates through the apparatus of about 45,000 cubic feet or more per hour, and preferably at flow rates of up to 56,000 cubic feet per hour and 73,000 cubic feet per hour.

In addition, the apparatus can comprise a flame screen located in the housing. The valve in the housing, furthermore, can comprise an opening in the flame screen of approximately 6 inches in diameter. The apparatus in this aspect of the present invention can also comprise a relief valve in the housing. Preferably, the relief valve opens at pressures of about 2 psi or greater.

In a more preferred embodiment, the apparatus of the present invention further comprises a header pipe in the housing connected to the conduit which conducts petroleum vapors into the housing. This header pipe then directs petroleum vapors into two other pipes, which themselves are connected to the inlet ends of the two adsorber beds. In another embodiment, the header pipe can conduct petroleum vapors into three or more adsorber beds.

The housing of the apparatus is preferably formed from a material which resists corrosion and degradation caused by sea water and sunlight. Alternatively, the housing can be coated with a material which resists such corrosion and degradation. The apparatus can, additionally, comprise rollers in the floor of the housing to facilitate the loading and removal of the adsorber bed or beds.

DESCRIPTION OF THE PREFERRED EMBODIMENTS

I. Petroleum Vapor Control Apparatus and Method of Use

Figure 1:
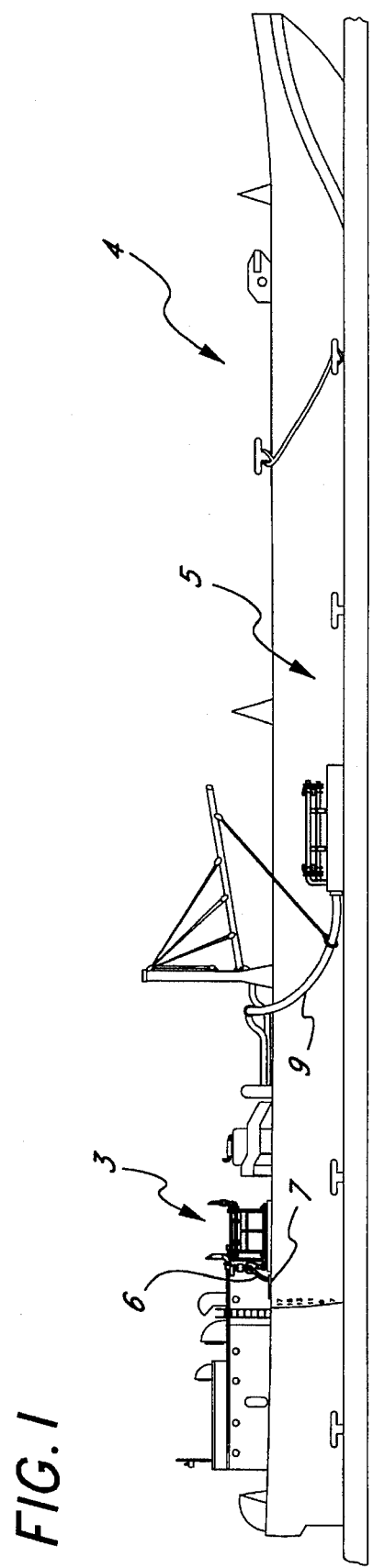
FIG. 1 is a side elevational view of one preferred embodiment of the present invention on a barge during the loading of the barge with liquid petroleum.

In one preferred embodiment, the vapor control apparatus of the present invention is used on a barge which lacks an inerting system and a means for presenting vapors to a shore-side facility. As shown in FIG. 1, in one possible mode of operation the vapor control apparatus 3 sits on the deck of a barge 4 at a dock 5 during the loading of liquid petroleum onto the barge 4. A vapor collection hose 6 is attached at one end to the vapor control apparatus 3 and fitted at its other end to an atmospheric vent 7, such as a pressure/vacuum vent, of a compartment to be loaded with petroleum products. In a preferred embodiment, the hose 6 may be connected to different adapters so that it may be connected to atmospheric vents of various sizes.

Figure 3:
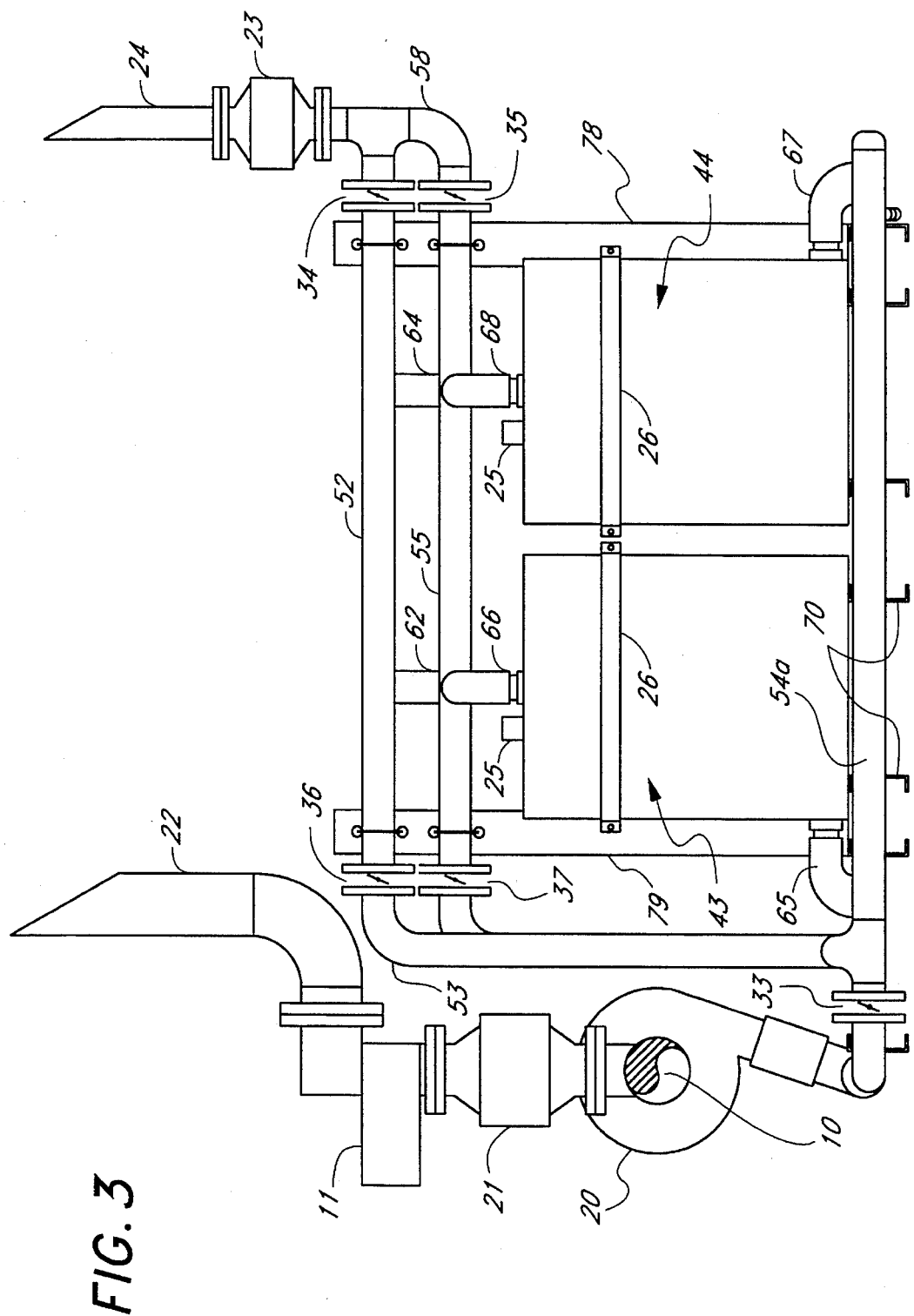
FIG. 3 is a side view of a preferred embodiment of the present invention.

Petroleum products are then loaded onto the barge 4 through a conduit 9. Referring now to FIGS. 1 and 3, vapors passing through the vapor collection hose 6 are ducted to an inlet 10 of the vapor control apparatus 3, and from there are passed through an adsorber bed (43 or 44 in FIG. 3). As used herein, the term "adsorber" or "adsorber bed" signifies a canister or drum containing an adsorbent material, preferably a solid adsorbent material such as activated carbon. A solid adsorbent material itself can be referred to as a "reactor bed".

In a preferred embodiment, the adsorber bed comprises activated carbon which has been impregnated with a caustic solution. In this embodiment, pollutants such as hydrocarbons, carbon dioxide, carbon monoxide, hydrogen sulfide, sulfur-containing organic compounds, NOx, and SOx are removed from petroleum vapors as they pass through the adsorber bed. The term "petroleum vapor" or "petroleum vapors", as used herein, shall mean a gaseous mixture comprising air and at least some of the foregoing pollutants.

If only sulfur-containing compounds are desired to be removed, a caustic solution may be used in place of a reactor bed of activated carbon or other solid adsorbent material. In this embodiment (not shown), the reactor bed is replaced by a liquid caustic material. The petroleum vapors from the cargo compartment of a ship are bubbled through the caustic solution to remove sulfur-containing compounds from the vapors. In an alternate embodiment, the caustic solution is sprayed over webbing inside the container of the adsorber so that the vapor passing through the adsorber may contact the caustic solution. Other means for contacting vapors with a caustic solution are well known in the art and may similarly be used in the portable vapor control apparatus of the present invention.

During the loading of petroleum onto the barge 4, if the loading rate exceeds the rate for which the vapor control apparatus is designed to process petroleum vapors, additional reactor beds in the apparatus may be used in parallel, if they are not already in use. Alternatively, a second vapor control apparatus may be used, or the loading rate may be slowed. The size and number of reactor beds used in the vapor control apparatus will, of course, vary from application to application, depending on factors such as the fill rate of the petroleum-containing receptacle and the expected cargo size.

After passing through the adsorber bed, the gases not adsorbed by the adsorber bed are vented to the atmosphere through an effluent gas system. In a preferred embodiment, the effluent gas system comprises a vertical pipe 24, a pipe 58, and a flame arrester 23. When the adsorber bed comprises activated carbon, potassium permanganate indicators 25 on the drums of the adsorber bed can be used to warn or verify when a reactor is spent and requires changing. Such indicators should occasionally be checked in order to ensure that the reactor beds have not been saturated with pollutants.

Once the adsorbent material of an adsorber is saturated, the adsorber must be replaced. Saturated adsorbers may be sent away to disposal sites, or to vendors who regenerate the adsorber beds so that they may be used again. If an adsorber bed becomes saturated during the filling of a vessel, an off-line adsorber bed in the apparatus may be put into operation, or another vapor control apparatus may be connected to the source of petroleum vapors.

As each cargo compartment is filled to a desired level, the vapor collection hose 6 is disconnected and then reconnected to the atmospheric vent of another compartment until all compartments have been filled. One embodiment of the present invention comprises a plurality of hoses. In this embodiment, the atmospheric vents of all the cargo compartments of a vessel to be filled are connected to the vapor control apparatus at once, so that various compartments of the ship may be filled without having to disconnect and reconnect vapor collection hoses each time a different cargo compartment is desired to be filled. The plurality of hoses duct vapors to a common collection manifold, and from there the vapors are passed through the reactor beds. Of course, if the venting system of the vessel is already set up to duct vapors to a common collection manifold, the vapor collection hose 6 need only be connected to that manifold to effect the removal of pollutants from such vapors.

When all compartments of a barge or other vessel have been filled to desired levels, the vapor control apparatus is returned to the dock 5. To move the apparatus 3 from the deck of the barge 4 to the dock 5, a crane (not shown) engages ribs 70 made of channel steel on the underside of the apparatus. The crane then lifts the apparatus off the deck of the barge 4 and moves it to a desired location on the dock 5. In one embodiment, the ribs 70 may have lift points (not shown) for the crane to engage. The ribs comprise a part of the support structure of the apparatus and help bear the weight of the device so that cranes, forklifts, or other suitable means may engage the apparatus and transport it to a site in need of petroleum vapor control. Thus, the apparatus is designed to be easily moved to locations in need of petroleum vapor control.

In an alternate embodiment, the vapor control apparatus 3 is fixed on board the barge 4. When the barge 4 is ready to be loaded with petroleum products, hoses attached to the vapor control apparatus are connected to the venting system of the barge's cargo compartments. Alternatively, fixed piping (not shown) may be installed to connect the vapor control apparatus to the venting system of the barge's cargo compartments. The procedure outlined above is then followed to remove hydrocarbons and other pollutants from the gaseous materials exiting the cargo compartments of the barge.

Figure 2:
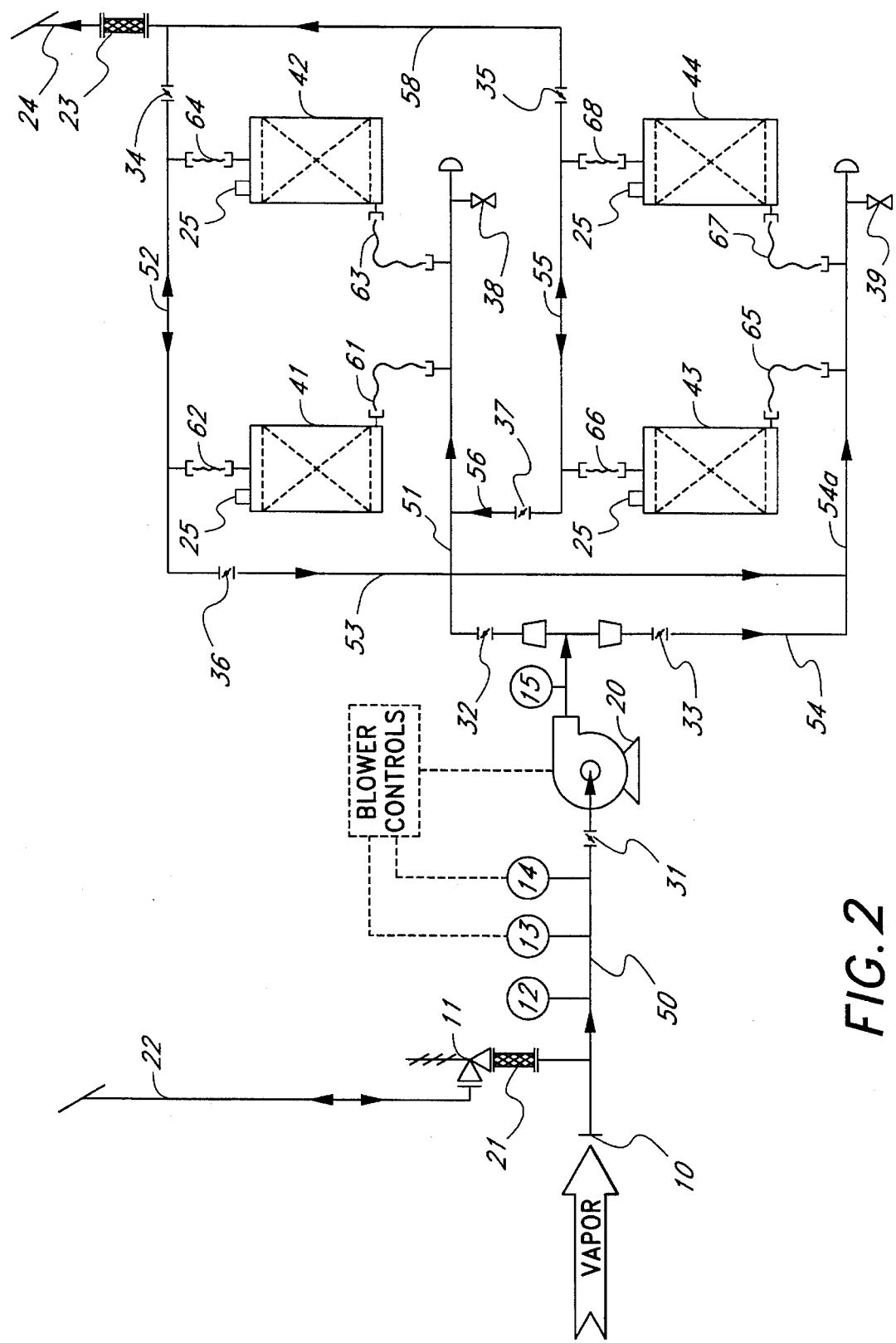
FIG. 2 is a flow diagram showing the major components of a preferred embodiment of the present invention and the flow of gases through this embodiment.

FIG. 2 diagrams the flow of vapor through the vapor control apparatus of the present invention. Referring to FIG. 2, gaseous materials from a source of petroleum vapor enter the apparatus through an inlet 10 and flow through tube 50, past a pressure/vacuum relief valve 11 and a flame arrester 21. The pressure/vacuum relief valve 11 is preferably set to open if the pressure in the device rises above 0.8 psi (pounds per square inch) or falls below 0.4 psi. If the valve 11 opens and releases unprocessed petroleum vapor to the atmosphere, the flame arrester 21 prevents the combustion of such vapor.

The gaseous materials then flow past a pressure indicator 12, which preferably has a range of about 30 inches of mercury. The pressure indicator 12 displays the inlet pressure of the vapor entering the apparatus. Next to the pressure indicator 12 on tube 50 is a high pressure indicator 13 and a low pressure indicator 14, which present warning signals when the maximum or minimum recommended operating pressures, respectively, are exceeded.

Past the pressure indicators on tube 50 is a main control valve 31, which remains open during the normal operation of the apparatus. This valve, like the other valves used in this embodiment of the device, is a manually operated valve such as a butterfly valve well known in the art. At the end of the tube 50 is a blower 20 which draws vapor into the apparatus and then impels it through one or more adsorber beds. In a preferred embodiment, these adsorber beds are activated carbon adsorbers such as the Model 200 made by Cameron-Yakima, Inc. In another preferred embodiment, as previously mentioned, the activated carbon in such beds is impregnated with a caustic solution.

A pressure indicator 15 near the outlet end of the blower displays the pressure of the stream of vapor as it leaves the blower. After leaving the blower, the gaseous materials flow through one of several flow paths, depending on which of a series of valves is open or closed. In flow path 1, valve 32 is open and valve 33 is closed so that the gaseous materials flow through line 51. Valves 37 and 38 are likewise closed so that the gaseous materials flow into the intake ends of adsorber beds 41 and 42. In this flow path, valve 34 remains open and valve 36 is closed, so that the non-adsorbed gaseous materials leaving the outlet ends of the adsorbers are forced to flow through line 52, into line 58, and past flame arrestor 23. These gaseous materials are then vented to the atmosphere through an outlet 24.

In this flow path, the two adsorber beds 41, 42 are used in parallel, while the adsorber beds 43, 44 lie idle. This flow path might be desired if the use of two adsorber beds in parallel is sufficient to handle the flow of vapor passing through the apparatus and if no further processing of the vapor is necessary. This flow path would also be used if the flow through adsorber beds 43 and 44 must be shut off, such as when they have been saturated with pollutants and it is necessary to replace them.

In flow path 2, valve 32 is closed and valve 33 is open so that the gaseous materials leaving the blower 20 flow through line 54 and into line 54a. Valves 36 and 39 are also closed so that the gaseous materials are channeled to the intake ends of adsorber beds 43 and 44. On the outlet ends of adsorber beds 43 and 44, valves 37 and 34 are shut and valve 35 is open so that the non-adsorbed gaseous materials pass through line 55 and into line 58. These gases are then subsequently vented to the atmosphere. As in flow path 1, only two of the adsorber beds, in this case adsorber beds 43 and 44, are used in parallel. Adsorber beds 41 and 42 are off-line so that they may be replaced or saved for future use.

In flow path 3, all four adsorber beds are in use. In this flow path, valve 33 is open and valve 32 is closed, so that the gaseous materials flow through line 54. Valves 36 and 39 are also closed, so that the materials pass through adsorber beds 43 and 44. On the outlet ends of adsorber beds 43 and 44, valve 37 is open and valve 35 is closed so that the non-adsorbed gaseous materials pass from line 55 into line 56. They next flow into line 51 and through the adsorber beds 41 and 42. Valve 34 is open downstream from these adsorbers, and since valves 35 and 36 are closed, the remaining gaseous materials will be directed through line 52 and into line 58. From there, these gases are vented to the atmosphere.

In this flow path, therefore, the gaseous materials first flow through adsorber beds 43 and 44 in parallel, and then pass through adsorber beds 41 and 42 in parallel, so that the gaseous materials have in the end passed through two adsorber beds in series. This flow path is desirable when passing the gaseous materials through one set of adsorber beds alone does not sufficiently remove pollutants from those gaseous materials, and when passing the gaseous materials through two adsorber beds in series is desired.

In flow path 4, the gaseous materials are passed through two adsorber beds in series as in flow path 3, except that the gaseous materials first pass through adsorber beds 41 and 42 before passing through adsorber beds 43 and 44. In this flow path, valve 33 is closed and valve 32 is open so that the gaseous materials first pass through line 51. Valves 37 and 38 are closed so that the gaseous materials next pass through one of the adsorbers 41 and 42. Valves 34 and 39 are closed, while valve 36 is open so that the gaseous materials next flow through adsorber beds 43 and 44. On the outlet ends of the adsorber beds 43 and 44, valve 35 is open, while valves 34 and 37 remain closed, so that the non-adsorbed gaseous materials next flow through line 58 and are vented to the atmosphere.

In flow path 5, finally, both of valves 32 and 33 are open. Valves 36, 37, 38 and 39 are all closed, while valves 34 and 35 are open. In this way, the gaseous materials entering line 54 flow through line 54a and through adsorber beds 43 and 44 before flowing through valve 35 and into line 58. The gaseous materials entering line 51, on the other hand, flow through adsorber beds 41 and 42 before passing through valve 34 and flowing into line 58. The non-adsorbed gaseous materials flowing through the outlet ends of both sets of adsorber beds then flow through flame arrester 23 and are vented to the atmosphere.

As can be seen from the foregoing, the vapor control device of the present invention can be operated so as to direct petroleum vapors through multiple adsorber beds either in series or in parallel. Advantageously, the adsorber beds can be used in series at first, when they are not substantially saturated with pollutants. Then, when the adsorber beds are saturated to the point that passing petroleum vapors through them once does not sufficiently remove pollutants from the vapors, the device of the present invention can be changed to series operation, so that the petroleum vapors pass through two adsorbers.

Figure 4:
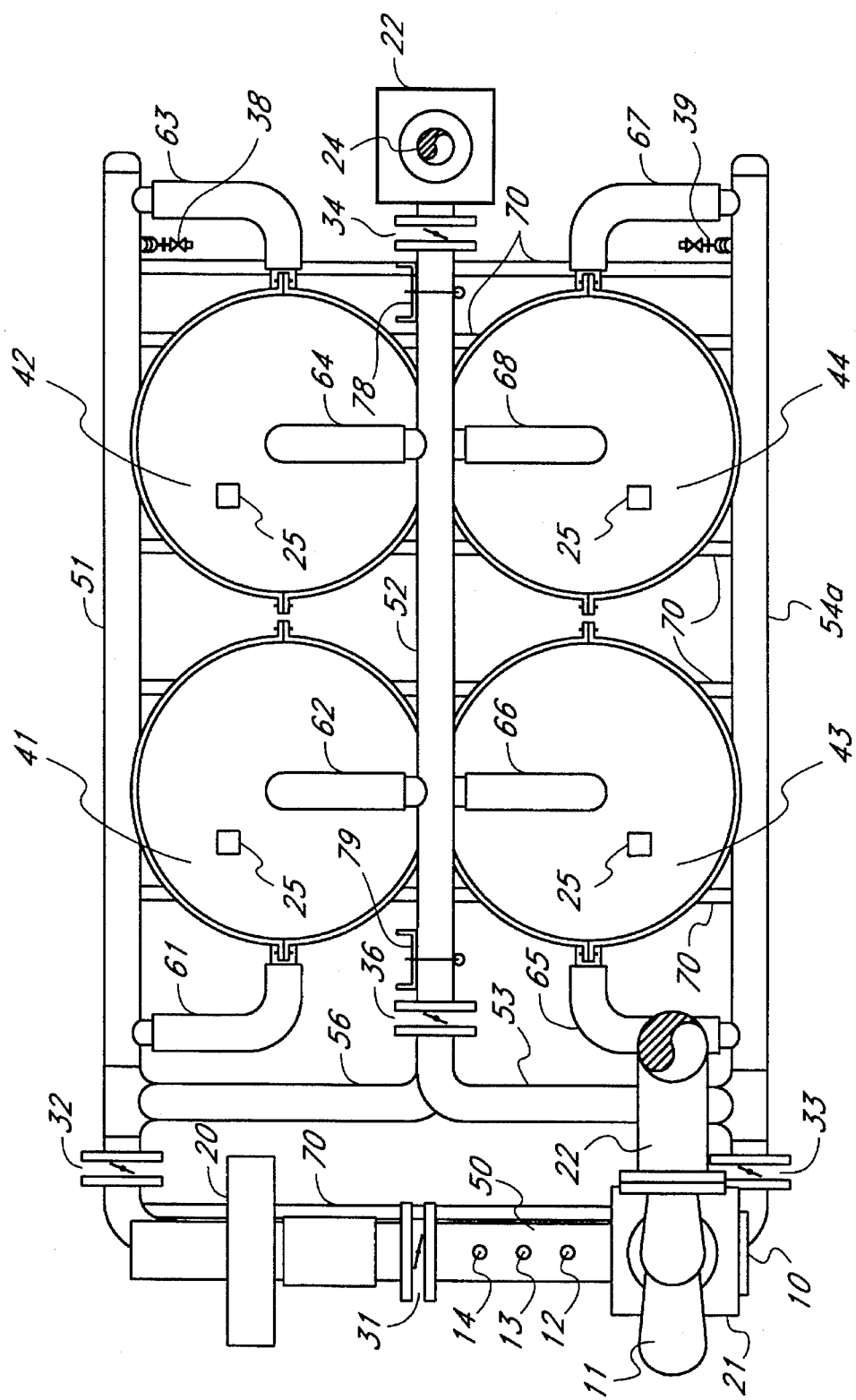
FIG. 4 is a plan view of the apparatus shown in FIG. 3.

Referring now to FIGS. 3 and 4, the inlet 10 is adapted to connect with hoses (not shown) which duct petroleum vapors from a source of volatile petroleum products. As shown in FIG. 3, located slightly downstream from and above the inlet 10 is a flame arrester 21, a pressure/vacuum valve 11 and a pressure/vacuum vent 22. As best shown in FIG. 2, the flame arrester 21 is located between the pressure/vacuum valve 11 and the inlet stream of vapor. In that way, should the pressure/vacuum valve 11 be forced to open due to the high pressure of an incoming stream of vapor, the flame arrester 21 will prevent the combustion of such vapors when they are vented through the pressure/vacuum vent 22.

Figure 5:
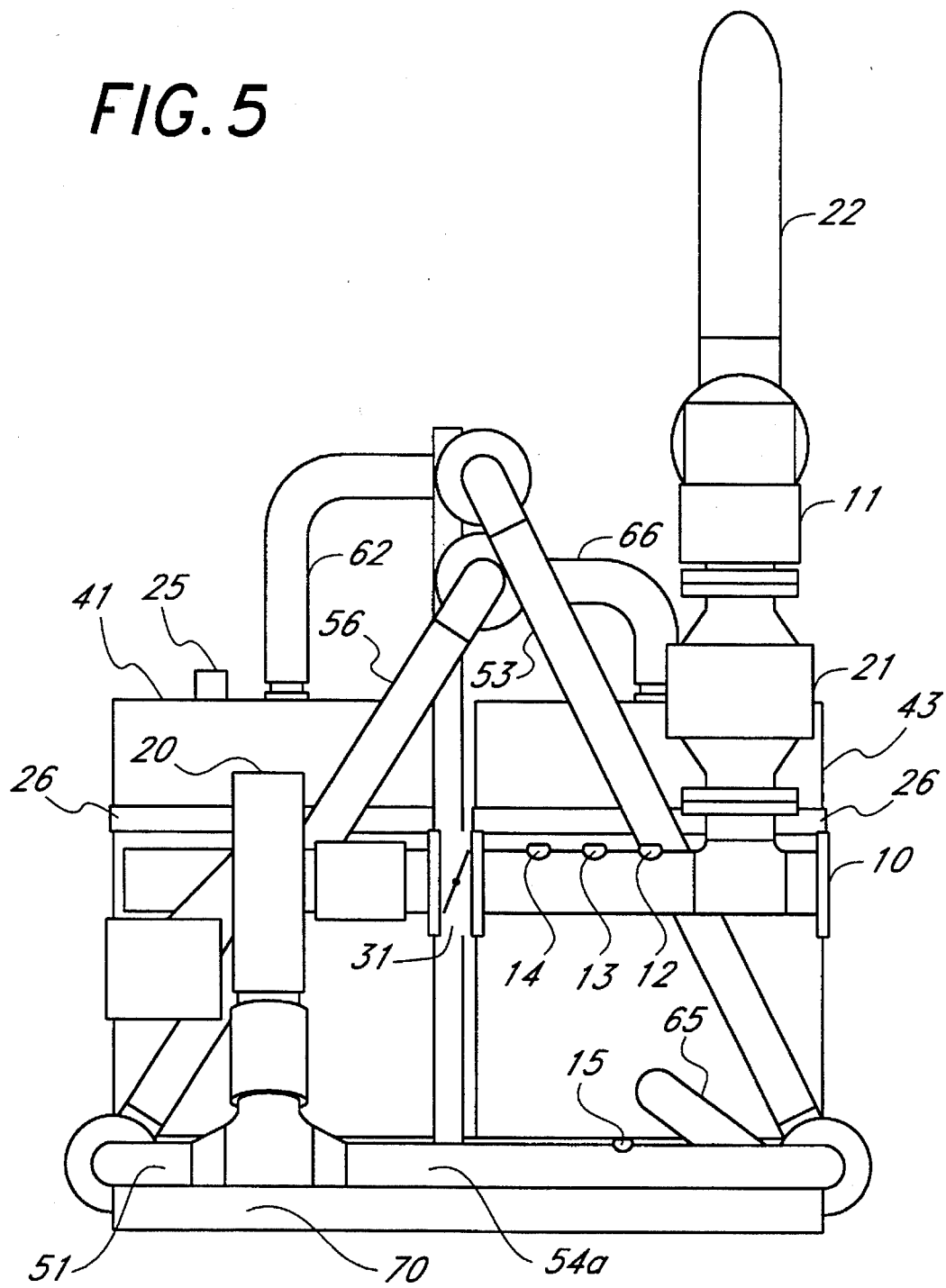
FIG. 5 is an end view of the inlet end of the apparatus shown in FIG. 3.

As seen in FIGS. 4 and 5, a tube 50 is connected to the inlet 10 and contains a number of pressure indicators. In a preferred embodiment, these indicators include a pressure gauge 12 for displaying the inlet pressure of the incoming stream of petroleum vapor, a high pressure indicator 13 for signaling when the pressure of the vapor flowing through the apparatus exceeds the recommended operating pressures, and a low pressure indicator 14 for indicating when the incoming stream of vapor falls below recommended operating pressures. The tube 50 also includes a main control valve 31 for shutting off the incoming flow of vapor. Main control valve 31 remains open during the normal operation of the apparatus.

The tube 50 is then connected to a blower 20 which draws the stream of vapor through tube 50 and impels it through the remainder of the apparatus. As best shown in FIG. 3, the blower directs the incoming gaseous materials in a generally downward direction. These materials then flow into one of the pipes 51 or 54, or into both of these pipes, as shown in FIGS. 4 and 5. Referring now to FIG. 3, pipe 54a, which is connected to pipe 54, is further connected to intake hoses 65 and 67, which are in turn connected to adsorber beds 43 and 44, respectively. Pipe 51 is similarly connected to adsorber beds 41 and 42 via intake hoses 61 and 63, respectively, as shown in FIG. 4. Outlet hoses 62, 64, 66, 68 then conduct the gases which have passed through the adsorber beds to conduits which duct these gases either to the atmosphere or to another set of adsorber beds for further processing. Although hoses 61, 62, 63, 64, 65, 66, 67, and 68 can be made from a rigid material, such as a metal, in a preferred embodiment they are made from a softer, more flexible material.

Figure 6:
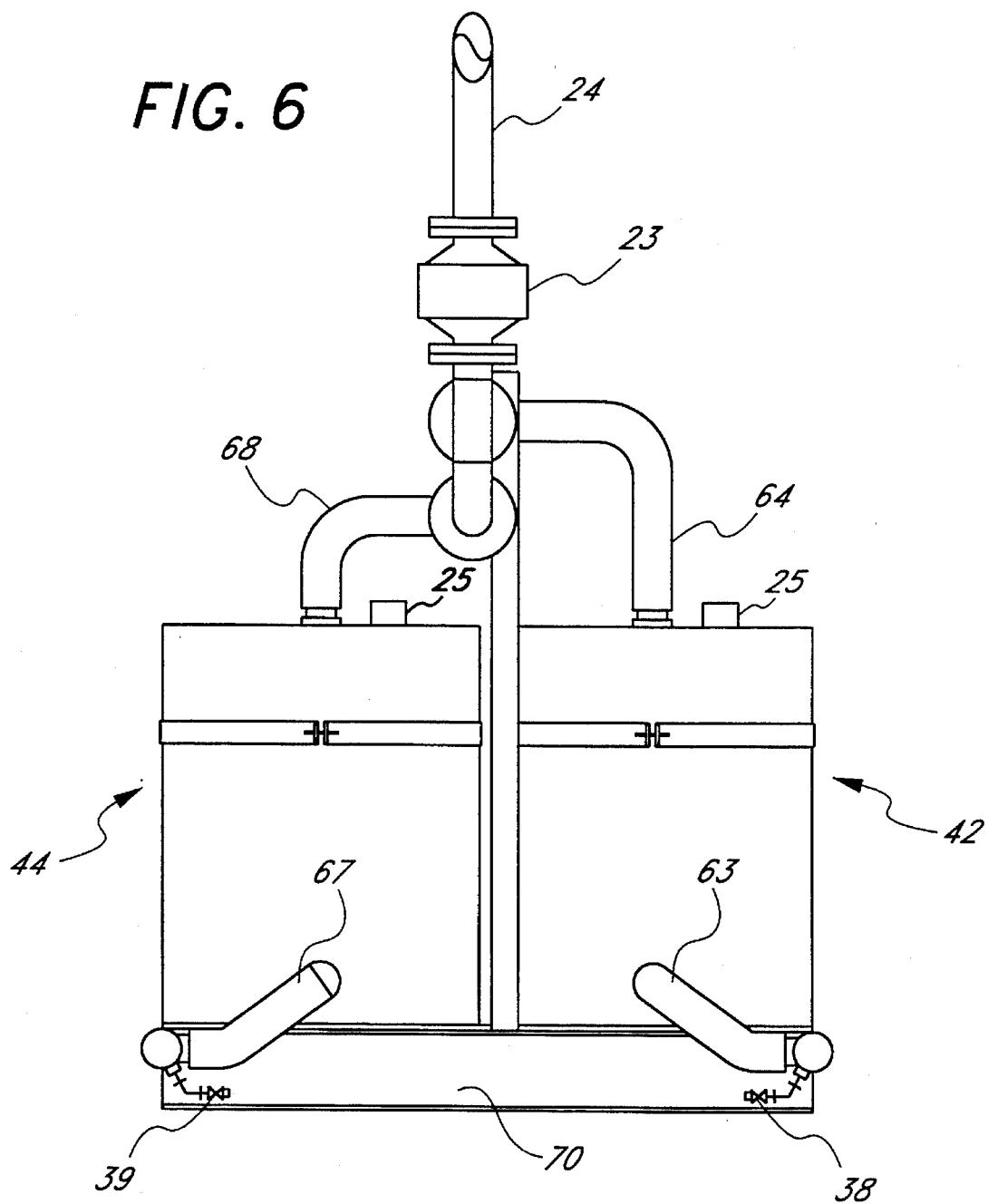
FIG. 6 is an end view of the outlet end of the apparatus shown in FIG. 3.

As seen in FIGS. 4–6, an outlet hose 66, connected to the adsorber bed 43, and another outlet hose 68, connected to the adsorber bed 44, are connected to pipe 55. Similarly, an outlet hose 62, connected to adsorber bed 41, and an outlet hose 64, connected to adsorber bed 42, are both connected to pipe 52. A valve 36 on pipe 52 and a valve 37 on pipe 55 control the flow of processed gas into pipes 53 and 56, respectively, which duct the processed gas back into the apparatus for further processing. Valves 34 and 35 on pipes 52 and 55, respectively, control the flow of processed gas into a pipe 58, which leads to an outlet 24. Between pipe 58 and the outlet 24 is a flame arrester 23 which prevents the flaring of any combustible gases which exit the apparatus through the atmospheric vent 24.

FIGS. 3–6 illustrate a preferred embodiment in which some of the pipes serve both to duct vapors within the apparatus and to provide support to the apparatus. In this embodiment, the support structure of the apparatus is composed of pipes made of a suitably strong material, ribs made of channel steel, and other support members made of a suitably strong but light-weight material. The pipes comprising the support structure of this embodiment include pipes 51, 52, 53, 54, 54a, 55, and 56, which are integrally connected to each other by means of ribs 70 and support members 78 and 79. Referring to FIG. 4, the ribs 70 connect the pipes 51 and 54a. The ribs 70 also support adsorber beds 41, 42, 43, and 44. Support members 78 and 79 are attached to pipes 52 and 55 with a C-clamp and are welded to the ribs 70, thus rendering structural support to the apparatus. Using the pipes of the apparatus both to conduct vapors and to give support to the apparatus not only saves on the cost of materials but also allows the apparatus to remain light so as to be easily transportable.

Straps 26 can be used to connect the adsorber beds to the support members 78 and 79 and to each other in order to give further structural support to said apparatus. However, in a preferred embodiment, the adsorber beds are supported by a rigid frame, such as a metal frame.

II. Improved Petroleum Vapor Control Apparatus for Reducing Backpressure

One problem which has been encountered when scrubbing (that is, removing pollutants from) petroleum vapors is the generation of backpressure by petroleum vapor control devices. Backpressure is the pressure exerted against the gases flowing through such devices. Backpressure must be closely controlled when filling marine vessels, because the cargo compartments of such vessels have a limited ability to withstand pressure. For example, the hull of a barge would be likely to rupture if backpressures of 5 psi occurred in the cargo compartment of the barge.

The build up of back pressure in petroleum vapor control devices becomes particularly acute at high rates of petroleum vapor flow through such devices. High rates of petroleum vapor flow are those above about 45,000 cubic feet per hour. Such rates occur when filling a compartment with petroleum products at a rate of over about 8,000 barrels per hour.

When scrubbing petroleum vapors at a rate of about 56,000 cubic feet per hour using four Cameron Yakima Model 200 canisters, for example, we have observed backpressures of 1.8 psi. Higher pressures would have resulted but for a relief valve designed to open at about 2 psi, which opened and prevented such higher pressures. Of course, when the relief valve opened, unscrubbed vapors were vented to the atmosphere, thus lessening the effectiveness of the petroleum vapor control device.

A significant source of backpressure in petroleum vapor control devices which use adsorber beds is the relatively small diameter of the outlets of these adsorber beds. The outlets of such adsorbers commonly have diameters in the range of about 4" (that is, 4 inches). Such outlets, furthermore, normally feed into pipes of similarly limited diameter in typical petroleum vapor control devices. These small-diameter outlets and/or pipes constrict the flow of gases passing through such devices and thereby cause backpressure. Since the diameter of these outlets and/or pipes is not adjustable, the amount of backpressure produced in such devices likewise cannot be regulated.

Some backpressure is, of course, desirable in order to ensure that the petroleum vapors passing through the adsorber beds stay in contact with the adsorbent material in those beds long enough for those vapors to be scrubbed. When vapors pass through adsorber beds too quickly, an undesirable amount of pollutants may remain in the gas stream exiting the adsorbers.

In order to overcome the foregoing problems encountered with prior art petroleum vapor control devices and at the same time ensure sufficient scrubbing of petroleum vapors we have designed an alternate embodiment of the present invention. This embodiment alleviates the backpressure generated during the scrubbing of petroleum vapors by allowing such vapors to pass through an adsorbent material in a container and then exit that container through a relatively large diameter outlet.

In order for petroleum vapors to contact the adsorbent material in the adsorber beds in this embodiment for a sufficiently long period of time to effect the scrubbing of those vapors, furthermore, the pressure of the gases in the petroleum vapor control apparatus is controlled with a valve. Such a valve could, for example, be placed in the outlet of the adsorber bed or in a pipe connected to such an outlet. In a preferred embodiment, however, the adsorber beds are contained in a substantially air-tight housing, and the valve is located in the housing. The housing provides a zone of space surrounding the adsorber beds, and the pressure of the gas in this zone is controlled by the valve in the housing. In this way, the valve can maintain a relatively low pressure in the housing, thereby alleviating the problems of backpressure. At the same time, the zone surrounding the adsorber beds can be maintained at a higher pressure compared to the pressure of the atmosphere outside the housing, thereby lengthening the contact time between the petroleum vapors and the adsorbent material of the adsorbers.

One of the great advantages of providing a housing for the adsorber beds in this embodiment of the present invention is that such a housing can protect the adsorber beds from the environment, and in particular from the marine environment. The canister portions of most adsorbers, such as carbon bed adsorbers, are formed from metal. In the marine environment, we have found that metal-clad canisters corrode very rapidly, usually before the carbon beds themselves have been saturated. Plastic canisters would also tend to degrade on a marine vessel if not protected, due to exposure to sunlight. The housing is, therefore, preferably formed from a material which resists corrosion caused by the environment, and in particular by sea water and/or sunlight. Alternatively, the housing can be coated with a primer or other coating which protects it from sea water and/or sunlight.

Pressure in the housing of the device, as stated above, is preferably controlled, such as by a valve in the housing of the device. In general, pressures in the housing of between about 0.5 psi and 1.5 psi, and preferably around 1.25 psi, will assure sufficient contact time to effect the scrubbing of the vapors. In one embodiment, a fixed diameter outlet is used to regulate pressure in the housing of the device. Such a valve can, for example, be located in a flame arrestor of the housing. Preferably, such a fixed diameter outlet is 6" in diameter. Conventional one-way valves set to open at a desired pressure can also be used. Of course, if pressure in the housing does continue to build up past the desired pressure, providing a pressure relief valve will assure that gases in the housing are vented to the atmosphere in order to relieve such excess pressure.

Figure 7:
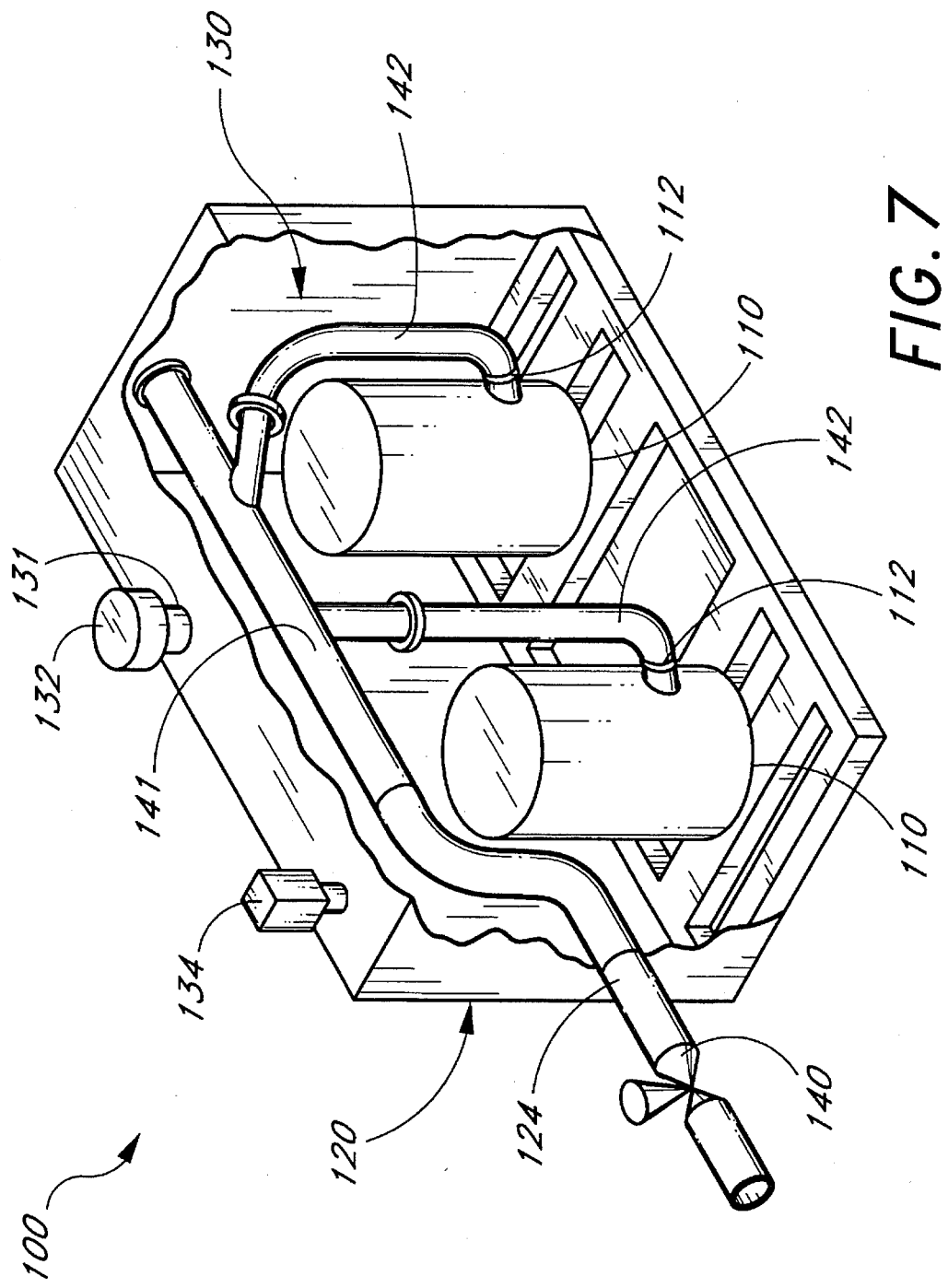
FIG. 7 is a cutaway view of an improved petroleum vapor control apparatus which reduces the backpressure generated during the scrubbing of large volumes of petroleum vapors. The front wall of the housing of this apparatus has been cut away in this figure.
Figure 9:
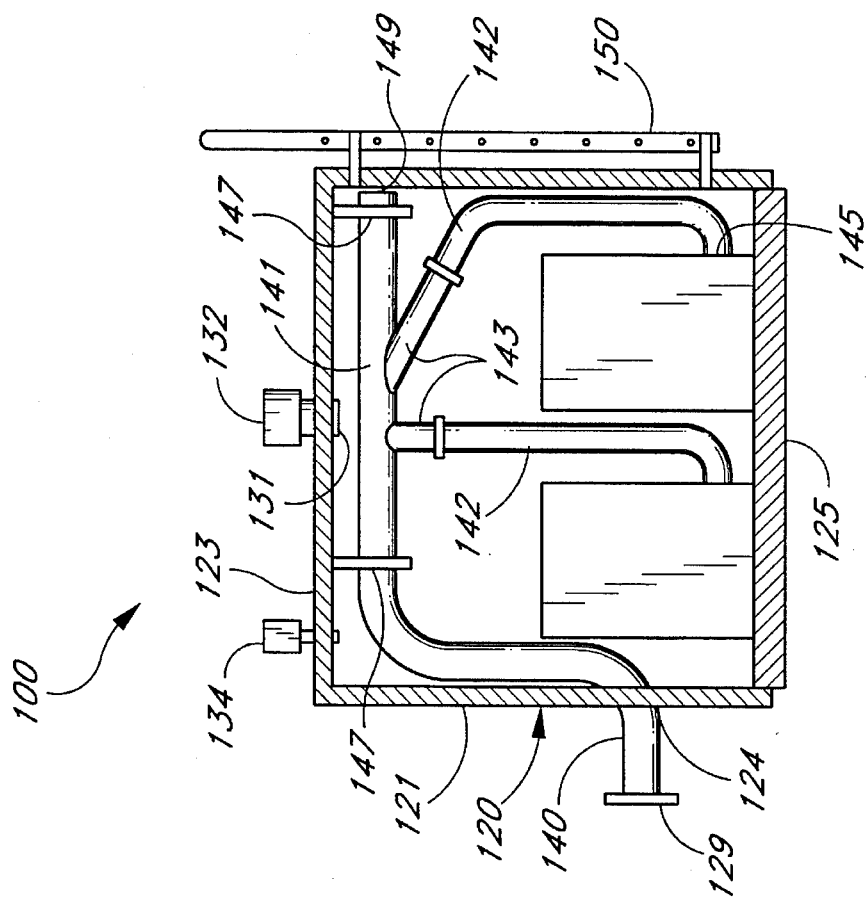
FIG. 9 is a front view of the apparatus shown in FIG. 8 with the side 127 of the apparatus removed so as to expose the interior of the apparatus.
Figure 8:
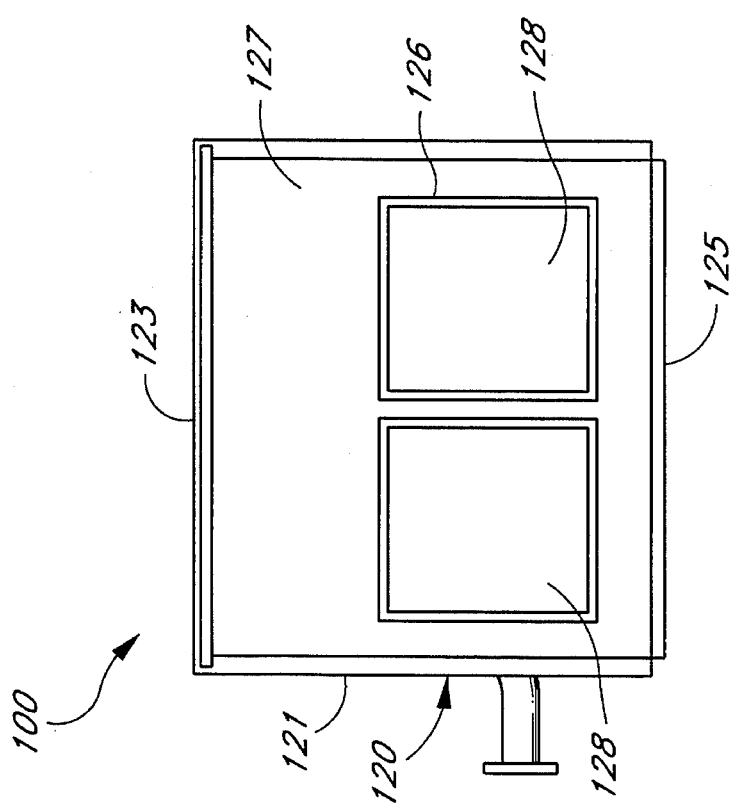
FIG. 8 is a front view of the apparatus of FIG. 7.

Referring now to FIGS. 7–9, an apparatus 100 in this embodiment of the present invention comprises adsorber beds 110. Adsorber beds 110 can, for example, be activated carbon adsorber beds. In a preferred embodiment, the activated carbon beds used are NIXTOX N250 carbon adsorber beds made by Tiggs. These beds comprise a cylinder of activated carbon surrounded by wire mesh walls housed in a canister. A passage from the inlet of the adsorber bed into the interior of the adsorber bed delivers gas into the core of the activated carbon, and gas then exits the adsorber bed by passing through the activated carbon core. While the canisters used in previous embodiments of the portable vapor control apparatus had 4" inlets and outlets, the canisters used in this embodiment are larger, thereby lessening backpressure.

Of course, other types of adsorber beds 110 could be used as well, such as iron oxide adsorber beds or activated carbon beds having pellet sizes different from those of NIXTOX N250 canisters.

The adsorber beds used should have a gas outlet which has a sufficiently wide diameter to avoid the buildup of backpressure. Such an outlet must be able to allow scrubbed vapors to exit the adsorber bed at a fast enough rate so that no appreciable backpressure results, even during periods of high volume vapor processing, that is, at petroleum fill rates of over 8,000 barrels per hour and as high as 13,000–14,000 barrels per hour. During such periods, the petroleum vapor flow rate can be from about 45,000 cubic feet per hour to 56,000 cubic feet per hour to 73,000 cubic feet per hour or more.

In general, outlets having a diameter over 8 inches should allow sufficient gas passage to prevent significant backpressure, though 10 inch diameter outlets are preferred. The pipes used elsewhere to conduct gases in the petroleum vapor control apparatus should be of similar dimensions. Of course, the outlet of the adsorber bed could also have a surface area larger than that of a 10 inch diameter outlet, since the pressure in the housing is controlled by a valve in the housing itself.

The adsorber beds 110 are housed in a substantially airtight housing 120. Thus, after petroleum vapors pass through the activated carbon of the adsorber beds 110 and pass through the outlets of the canisters of such adsorber beds, the scrubbed vapors enter a zone 130 which is at relatively low pressure. Such a housing 120 can act both to protect the canisters and the activated carbon of the adsorbers 110 from salt spray and the weather and to provide a zone 130 of controlled pressure for gases exiting the adsorber beds 110. Preferably, the housing 120 comprises a pressure relief valve 134 for venting gases inside the housing 120 when the pressure inside the housing 120 exceeds a set value, typically around 2 psi.

Most of the gases which pass through the adsorber beds 110 and empty into the housing 120 should leave the housing only through designated ports, such as relief valves 134 or flame arrestors 132. Thus, in a preferred embodiment, the walls of the housing 120 are made from ½" steel plate, to provide structural support to the apparatus 100, and are sealed to prevent leakage of gases from inside the housing 120 to the atmosphere. Any suitable material which is gas impermeable and can withstand around 2 psi of pressure can be used, however.

The housing 120 is further provided with an opening 124 through which petroleum vapors are passed into the housing 120. Such vapors are conducted into the housing 120 through a pipe 140 which passes through the opening 124. The pipe is preferably fitted with a valve 136, such as a butterfly valve or a rising stem valve, to control the passage of vapor through the pipe 140.

The pipe 140 can, in one embodiment, feed directly into an adsorber bed 110. However, for ease of construction, a second pipe 142, such as a soft PVC-lined hose, is preferably used to conduct vapors from pipe 140 to the adsorber bed 110. When more than one adsorber bed 110 is used in the housing 120, pipes 140 and 142 can be connected by a header pipe 141 which feeds incoming petroleum vapors into the pipes 142. The pipes 142 then connect to the inlets 112 of each of the carbon adsorber beds 110. The inlets 112 direct petroleum vapors into the activated carbon of the adsorber beds. In a preferred embodiment, the apparatus 100 is designed to contain two NIXTOX 250 canisters. Of course, three or more adsorber beds can be used in this embodiment of the invention as in previous embodiments.

In one embodiment, the floor 138 of the interior of the housing 120 can be outfitted with rollers to assist in the loading and removal of the adsorber beds 110. In this way, friction between the floor 138 and the bottom of the adsorber beds 110 is greatly lessened. The floor 138 of the housing 120 can, in addition, comprise a rigid framework 139 to support the adsorbers 110.

In order to secure the adsorber beds to the floor 138 of the housing 120, it is advantageous for the lower face of the adsorbers 110 to have a channel or groove which matches a correspondingly shaped protruding counterpart in the floor 138 of the interior of the housing, so that a channel seal can be formed between the adsorber 110 and the floor 138 of the housing 120. Alternatively, the adsorbers 110 can be bolted to the floor 138 of the housing 120.

The apparatus 100 should additionally comprise a door or doors 128 in the housing 120 of the apparatus 100 to allow adsorbers 110 to be loaded and removed. Such door or doors 128 should, of course, be as long and wide as the adsorbers 110. A ladder 150 can optionally be provided with the apparatus 100 to facilitate work with the apparatus 100, such as setting or replacing the flame arrestor 132.

Example 1:

Apparatus Having Two Carbon Bed Adsorbers

An apparatus 100 according to the present embodiment can be roughly in the form of a rectangular box which is 84" high, 96" long, and 48" deep. The sides of this box, which form the housing 120 of the apparatus, are formed from ½" thick steel plate and are continuously welded together. The steel plate of the housing 120 and all of the steel used in the apparatus are coated with a primer in order to prevent corrosion of the steel.

One side 121 of the housing 120 includes an opening 124 for an 8" SCH 40 (schedule 40 or refinery grade) pipe 140. The 8" SCH 40 pipe 140 passes through this opening 124 and is welded to the housing 120. This pipe 140 has an 8", 150 lb. S.O. flange 129 on the end of the pipe 140 outside the housing 120, and can be connected to a source of petroleum vapors. The 8" SCH 40 pipe 140 can be a single piece of piping, or can be made from several shorter pipes joined together.

At the other end, this 8" SCH 40 pipe 140 is connected to an 8" SCH 40 header pipe 141. The header pipe 141 has two 10" SCH 40 pipes 143 extending out of it. The end 149 of the header pipe 141 distal to the end which is connected to the 10" SCH 40 pipes 140 is sealed with ⅜" plate steel. The header pipe 141 itself is supported inside the housing 120 by two steel plates 147 secured to the top 123 of the housing 120. The bottom of the housing 120 is indicated by reference numeral 125. These steel plates 147 have holes cut in them, and the header pipe 141 is placed through these holes in order to secure it.

The two 10" SCH 40 pipes 143 extending from the header pipe 141 are connected to 10" reinforced, PVC lined hoses 142 tested to 50 PSI. These hoses 142 are connected to the 10" SCH pipes 143 by means of a band. The distal ends 145 of each of these hoses 142 are connected with a band to the inlet 112 of a NIXTOX N250 carbon bed adsorber 110 through a 10" adsorber inlet 112. These adsorber beds 110 are held in place inside the housing 120 by means of a ⅜"×3" FB channel seal in the bottom of the canister which fits on top of a matching structure on the floor of the interior of the housing 120.

On one side 127 of the housing 120, two 37"×45" openings 126 are cut into the steel plate on that side 127 in order to allow the adsorber beds 110 to be put in and taken out. These openings 126 are bolted closed in an air-tight manner during the operation of the apparatus with ⅜" plate steel doors 128. A ⅛" TFE sheet gasket between the doors 128 and the side 127 of the housing 120 assures an air-tight fit.

The top 123 of the housing 120, finally, is fitted with a 6" flame screen 132, waukesha type VHA, whose 6" diameter acts as a valve 131 to control the pressure in the housing of the device. The top 123 of the housing 120 is also fitted with a 2" PV valve 134 set at 2.5 PSI (½ PSI vacuum) pressure.

Example 2

Method of Using the Petroleum Vapor Control Apparatus

In the embodiment of the invention shown in FIGS. 7–9, two NIXTOX N250 carbon bed adsorbers 110 are first loaded into the housing 120 of the apparatus through doors 128. Once inside the housing 120, the inlets 112 of the adsorbers 110 are connected to hoses 142 with a bands 112. The pipe 140 is then connected to a source of petroleum vapors, and the valve 136 is opened. In order to clean or replace the valve 131 in the housing 120 of the device, an operator simply climbs up ladder 150 to reach the valve 131.

As can be seen from the foregoing examples, the present invention is both mechanically simple and easy to use. Example 2 reveals how little training is needed to operate the apparatus of the present invention, and yet this apparatus is able to process high flow rates of petroleum vapors with sufficient scrubbing but without substantial backpressure. At the same time, the adsorbers used in this apparatus are protected from the elements. The present invention therefore provides a unique combination of advantages not found in devices of the prior art.

Although the invention has been described in terms of certain preferred embodiments, these embodiments are illustrative only and do not limit the present invention. Those skilled in the art will understand other ways of making and using this invention.

What I claim is:

1. An improved petroleum vapor control apparatus which reduces backpressure generated during scrubbing of petroleum vapors, comprising:

a) a substantially air-tight housing, said housing comprising a compartment for holding conduits and at least one adsorber bed, wherein said compartment further comprises a floor, and wherein said at least one adsorber bed is located on said floor, said at least one adsorber bed comprising an adsorbent material, an inlet end, and an outlet end, said housing further comprising an opening;

b) a first conduit passing through said opening for conducting petroleum vapors into said housing, said conduit having a first end and a second end, said first end being for connection to a source of petroleum vapors, said second end being connected to said inlet end of said at least one adsorber bed;

c) a zone of controlled pressure in said housing outside of said at least one adsorber bed, said controlled pressure being in the range of about 0.5 psi to about 1.5 psi, wherein said controlled pressure assures that said petroleum vapors contact said adsorbent material for a sufficient length of time to effect the scrubbing of said vapors;

d) a valve in said housing for maintaining said controlled pressure in said housing; and e) an outlet vent in said housing for venting scrubbed gases to the atmosphere.

2. The apparatus of claim 1, wherein said apparatus further comprises:

a) a header pipe in said housing connected to said second end of said first conduit for receiving said petroleum vapors from said first conduit;

b) a first pipe connected at a first end to said header pipe, said first pipe being connected at a second end to the inlet end of said at least one adsorber bed; and c) said at least one adsorber bed including a second adsorber bed, said second adsorber bed being connected at an intake end to a second end of a second pipe, wherein said second pipe is connected at a first end to said header pipe, said second adsorber bed further comprising an outlet, wherein gases pass out of said second adsorber bed through said outlet to enter said compartment of said housing.

3. The apparatus of claim 2, wherein said at least one adsorber bed comprises three or more adsorber beds, wherein each of said three or more adsorber beds is connected at an intake end to a pipe, said pipe being connected at another end to said header pipe, each of said three or more adsorber beds further comprising an outlet, wherein gases pass out of each of said three or more adsorber beds through said outlet to enter said compartment of said housing.

4. The apparatus of claim 1, wherein said adsorbent material is activated carbon.

5. The apparatus of claim 4, wherein said activated carbon is impregnated with a caustic solution.

6. The apparatus of claim 5, wherein said controlled pressure is about 1.25 psi.

7. The apparatus of claim 1, wherein said valve comprises an opening in said housing approximately 6 inches in diameter.

8. The apparatus of claim 1, wherein said valve is located on the outside of said housing.

9. The apparatus of claim 1, wherein said valve is capable of maintaining said controlled pressure at petroleum vapor flow rates of about 45,000 cubic feet or more per hour.

10. The apparatus of claim 9, wherein said valve is capable of maintaining said controlled pressure at petroleum vapor flow rates of about 56,000 cubic feet per hour.

11. The apparatus of claim 9, wherein said valve is capable of maintaining said controlled pressure at petroleum vapor flow rates of about 73,000 cubic feet per hour.

12. The apparatus of claim 1, wherein said outlet has a diameter which allows gas to be passed through said at least one adsorber bed without producing backpressure greater than about 2 psi at petroleum vapor flow rates of about 45,000 cubic feet or more per hour.

13. The apparatus of claim 12, wherein the diameter of said outlet is greater than about 8 inches.

14. The apparatus of claim 13, wherein the diameter of said outlet is about 10 inches.

15. The apparatus of claim 1, wherein said housing is formed from a material which resists corrosion and degradation caused by sea water and sunlight.

16. The apparatus of claim 1, wherein said housing is coated with a material which resists corrosion and degradation caused by sea water and sunlight.

17. The apparatus of claim 1, additionally comprising a relief valve in said housing.

18. The apparatus of claim 17, wherein said relief valve opens at pressures of about 2 psi or greater.

19. The apparatus of claim 1, additionally comprising a flame screen in said housing.

20. The apparatus of claim 19, wherein said valve comprises an opening in said flame screen of approximately 6 inches in diameter.

21. The apparatus of claim 1, additionally comprising rollers in said floor to facilitate the loading and removal of said at least one adsorber bed.

* * * * *